United States Patent
Li

(10) Patent No.: US 11,256,790 B2
(45) Date of Patent: Feb. 22, 2022

(54) FILE PROTECTION METHOD AND FILE PROCESSING SYSTEM THEREOF

(71) Applicant: Acer Incorporated, New Taipei (TW)

(72) Inventor: Hsien-Yang Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 231 days.

(21) Appl. No.: 16/543,642

(22) Filed: Aug. 19, 2019

(65) Prior Publication Data
US 2020/0184046 A1 Jun. 11, 2020

(30) Foreign Application Priority Data
Dec. 10, 2018 (TW) .................................. 107144259

(51) Int. Cl.
*G06F 21/31* (2013.01)
*G06F 21/60* (2013.01)
*G06F 21/62* (2013.01)

(52) U.S. Cl.
CPC ............ *G06F 21/31* (2013.01); *G06F 21/602* (2013.01); *G06F 21/6218* (2013.01)

(58) Field of Classification Search
CPC .... G06F 21/31; G06F 21/602; G06F 21/6218; G06F 21/10; G06F 16/182; G06F 16/13; G06F 21/62; G06F 2221/031; G06F 2221/2107; H04L 63/0428; H04W 12/02
See application file for complete search history.

(56) References Cited

U.S. PATENT DOCUMENTS

| | | | |
|---|---|---|---|
| 9,298,939 B2 * | 3/2016 | Margolin | G06F 21/10 |
| 10,395,248 B1 * | 8/2019 | Agarwal | G06Q 20/3821 |
| 2013/0311419 A1 * | 11/2013 | Xing | G06N 5/048 |
| | | | 706/55 |
| 2017/0046531 A1 * | 2/2017 | Roberts | H04L 9/14 |
| 2017/0339311 A1 * | 11/2017 | Ohashi | G06F 3/1285 |
| 2018/0068290 A1 * | 3/2018 | Xia | G06Q 30/06 |
| 2019/0132323 A1 * | 5/2019 | Williams | H04L 63/102 |
| 2019/0182042 A1 * | 6/2019 | Ebrahimi | H04L 63/083 |
| 2019/0220618 A1 * | 7/2019 | Ocher | H04L 9/3239 |
| 2020/0167450 A1 * | 5/2020 | Li | H04L 63/0876 |

FOREIGN PATENT DOCUMENTS

| | | |
|---|---|---|
| CN | 103366125 | 10/2013 |
| CN | 107204986 | 9/2017 |
| TW | 201009773 | 3/2010 |

OTHER PUBLICATIONS

Zuo et al., "Two-Way Real-Time Authentication System Based on Dynamic Password and Multi-biometric," 2012 International Conference on Computer Science and Service System Year: 2012 | Conference Paper | Publisher: IEEE.*

Kong et al., "Dynamic password token based on SM3 algorithm," 2016 International Conference on Audio, Language and Image Processing (ICALIP) Year: 2016 | Conference Paper | Publisher: IEEE.*

* cited by examiner

*Primary Examiner* — Roderick Tolentino
(74) *Attorney, Agent, or Firm* — JCIPRNET

(57) ABSTRACT

A file protecting method having following steps is provided: intercepting a data section in a module file, encrypting the data section according to a dynamic password; integrating other data sections that are not intercepted in the module file to update the module file, and storing the updated module file, the encrypted data section and the dynamic password. A corresponding data processing system is also provided.

8 Claims, 5 Drawing Sheets

FILE PROTECTION METHOD AND FILE PROCESSING SYSTEM THEREOF

CROSS-REFERENCE TO RELATED APPLICATION

This application claims the priority benefit of Taiwan application serial no. 107144259, filed on Dec. 10, 2018. The entirety of the above-mentioned patent application is hereby incorporated by reference herein and made a part of this specification.

BACKGROUND

Technical Field

The disclosure relates to a file protection technique, and particularly relates to a file protection method and a file processing system thereof.

Description of Related Art

In recent years, along with the rise of artificial intelligence, mechanical learning has been widely used in various fields. For example, the artificial intelligence may be applied in automated testing, automatic driving, personalized recommendation, etc. Since in the process of mechanical learning, a certain amount of data is adopted to perform training, and an applied algorithm and detail are different, module files created through the mechanical learning are the most important and valuable assets for developers. Therefore, the developers will adopt various ways to protect the module files.

In most enterprises, the protection method for the module file is mostly to store data to a server, and provide ports of various types of automation services as corresponding clients. When the client needs to analyze data through the module file, the server receives the data to be analyzed and calculates the data to be analyzed according to the module file, and then returns a calculation result to the client. In this way, the module file is only stored in the server, so as to avoid risks of leakage, eavesdropping, etc. However, if the data to be analyzed is huge (for example, a medical image), the process of uploading data from the client to the server becomes quite lengthy. Therefore, the need of storing module file on the client is gradually increasing. Meanwhile, how to maintain the security of the module file is a subject for technical personnel in this field.

SUMMARY

The disclosure is directed to a file protection method and a file processing system thereof, which enhance security of a module file.

An embodiment of the disclosure provides a file protection method including following steps: intercepting a data section in a module file; encrypting the data section according to a dynamic password; integrating other data sections that are not intercepted in the module file to update the module file; and storing the updated module file, the encrypted data section and the dynamic password.

An embodiment of the disclosure provides a file processing system including a storage, a data accessing unit, a data intercepting unit and a data encryption and decryption unit. The storage stores a module file. The data accessing unit is connected to the storage, and accesses the module file stored in the storage. The data intercepting unit is connected to the data accessing unit, and intercepts a data section in the module file. The data encryption and decryption unit is connected to the data intercepting unit, and encrypts the data section according to position information of the data section and content of the data section, and stores the encrypted data section. The data intercepting unit integrates other data sections that are not intercepted in the module file to update the module file, and stores the updated module file to the storage.

Based on the above description, the file processing system and file protection method of the disclosure may intercept and remove the data sections in the module file to displace the content of the module file to make it hard to be restored. Moreover, the intercepted data section is encrypted by a dynamic password to increase security.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
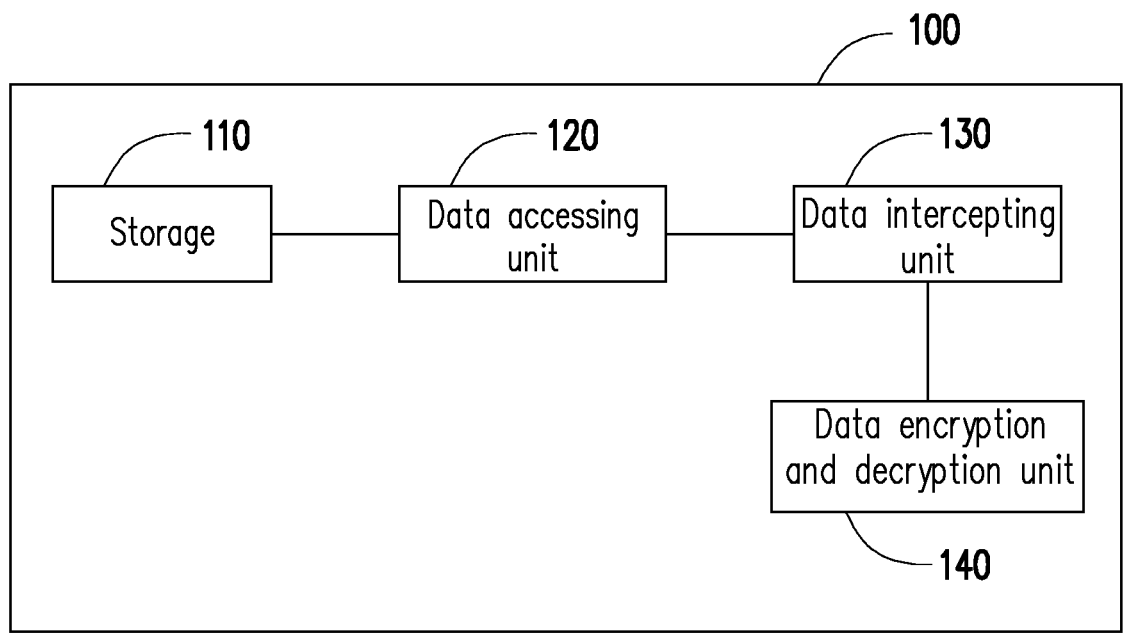
FIG. 1 is a system schematic diagram of a file processing system according to an embodiment of the disclosure.

FIG. 1 is a system schematic diagram of a file processing system according to an embodiment of the disclosure. Referring to FIG. 1, the file processing system 100 has a storage 110, a data accessing unit 120, a data intercepting unit 130 and a data encryption and decryption unit 140.

The storage 110 is used for storing data. Particularly, the storage unit 110 may store a module file. In the embodiment, the storage 110 may be any type of a fixed or movable Random Access Memory (RAM), a Read-Only Memory (ROM), a flash memory, a Hard Disk Drive (HDD), a Solid State Drive (SSD) or a similar device or a combination of the above devices, but the disclosure is not limited thereto.

The data accessing unit 120 is connected to the storage 110, and accesses various data stored in the storage. Particularly, the data accessing unit 120 may access the module file.

The data intercepting unit 130 is connected to the data accessing unit 120, and intercepts a data section in the module file.

The data encryption and decryption unit 140 is connected to the data accessing unit 120 and the data intercepting unit 130, and is configured to encrypt and decrypt data.

In the embodiment, the data accessing unit 120, the data intercepting unit 130 and the data encryption and decryption unit 140 may be respectively executed by different processors. In other embodiments of the disclosure, the data accessing unit 120, the data intercepting unit 130 and the data encryption and decryption unit 140 may be executed by a multiplexed processor, but the disclosure is not limited thereto. Moreover, the processor is, for example, a Central Processing Unit (CPU), or other programmable general purpose or special purpose microprocessor, a Digital Signal Processor (DSP), a programmable controller, an Application Specific Integrated Circuit (ASIC) or other similar device or a combination of the above devices, which is not limited by the disclosure.

Figure 2:
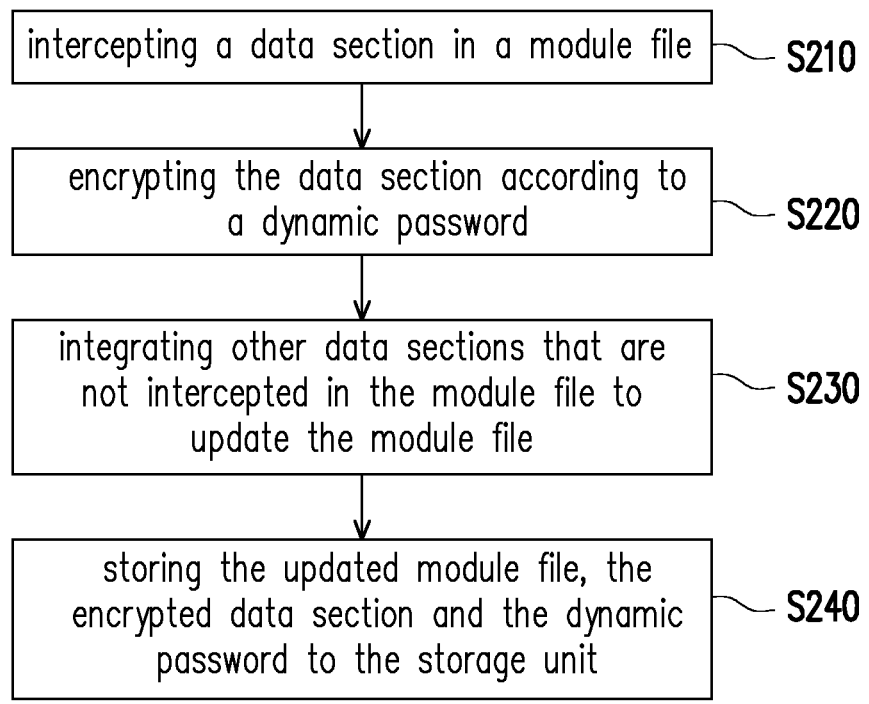
FIG. 2 is a flowchart illustrating a file protection method according to an embodiment of the disclosure.
Figure 3:
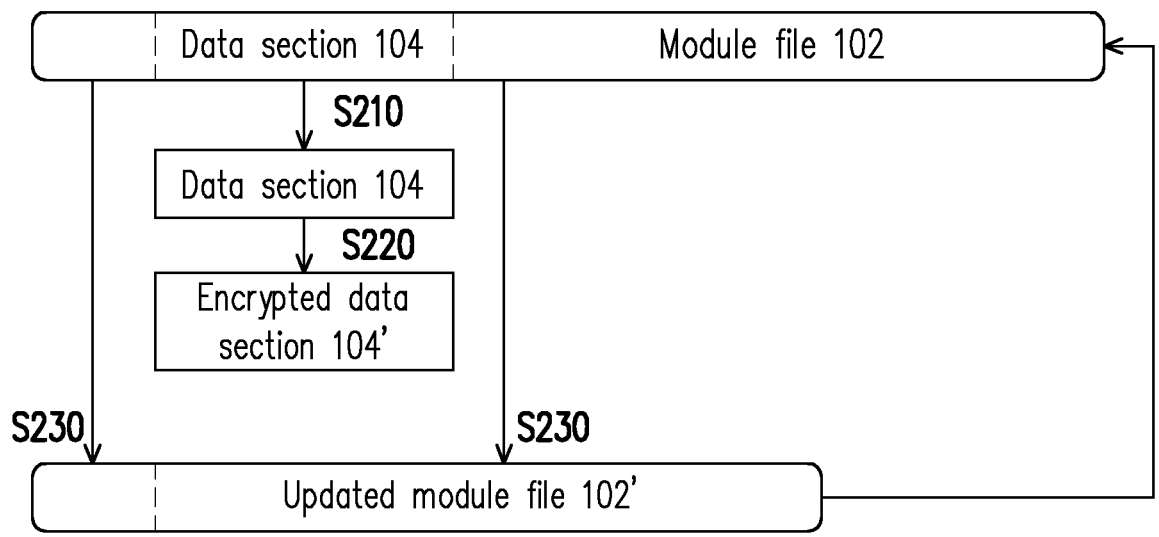
FIG. 3 is a schematic diagram of a module file structure according to an embodiment of the disclosure.

FIG. 2 is a flowchart illustrating a file protection method according to an embodiment of the disclosure. FIG. 3 is a schematic diagram of a module file structure according to an embodiment of the disclosure. The file protection method of FIG. 2 is at least adapted to the file processing system 100 of FIG. 1, and the module file structure of FIG. 3 at least corresponds to the file processing system 100 of FIG. 1 and the file protection method of FIG. 2.

Referring to FIG. 1 and FIG. 3, in a step S210, the data intercepting unit 130 intercepts a data section 104 in a module file 102. Namely, the data intercepting unit 130 intercepts the data section 104 in the module file 102 in a random manner, so as to spoil integrity of the module file. Moreover, in the embodiment of the disclosure, the content, size and position of the data section 104 intercepted by the data intercepting unit 130 are not limited by the disclosure. The data intercepting unit 130 may record or mark the position of the intercepted data section 104, and remove the data section 104 from the module file 102.

In a step S220, the data encryption and decryption unit 140 encrypts the data section according to a dynamic password. In an embodiment of the disclosure, the data encryption and decryption unit 140 may generate the dynamic password according to at least one of the position information of the data section 104, the content of the data section 104 and the size of the data section 104. For example, the data encryption and decryption unit 140 may directly adopt the position information of the data section 104, the content of the data section 104 or the size of the data section 104 to serve as the password. Alternatively, the data encryption and decryption unit 140 may randomly disturb one or a plurality of the position information of the data section 104, the content of the data section 104 and the size of the data section 104 to serve as the dynamic password. The data encryption and decryption unit 140 may also adopt a system time when the data section 104 is intercepted to serve as the dynamic password, or take the system time as a key to encrypt the data section, so as to generate the dynamic password, etc. Any method adapted to generate the dynamic password may be applied to the disclosure.

Besides, in the embodiment of the disclosure, the data encryption and decryption unit 140 takes the dynamic password as a key, and adopts an Advanced Encryption Standard (AES) algorithm to encrypt the data section 104, but the disclosure is not limited thereto.

In a step S230, the data intercepting unit 130 integrates other data sections that are not intercepted in the module file 102 to update the module file 102. Referring to FIG. 3, the data intercepting unit 130 may integrate the other data sections that are not intercepted in the module file 102 into a whole data block, and update the module file 102 by using the integrated data block. Namely, the module file 102 is now separated into two blocks, and one is the encrypted data section 104', and one is the updated module file 102'.

In a step S240, the data accessing unit 120 stores the updated module file 102', the encrypted data section 104' and the dynamic password to the storage 110. In an embodiment of the disclosure, the data accessing unit 120 compiles the updated module file 102', the encrypted data section 104' and the dynamic password into an executive file, and stores the executive file to the storage 110. In other words, the updated module file 102', the encrypted data section 104' and the dynamic password are stored in the storage 110 in form of the executive file.

Based on the above description, since integrity of the updated module file 102' has been spoiled, even if the module file 102' is obtained by an unauthorized user, the unauthorized user still cannot obtain the original module file 102. In other embodiments of the disclosure, the data accessing unit 120 may further add a strong name signing to the executive file, or obfuscate an intermediate code generated through the compilation and encrypt the obfuscated file to avoid decompilation of the executive file, but the disclosure is not limited thereto.

Figure 4:
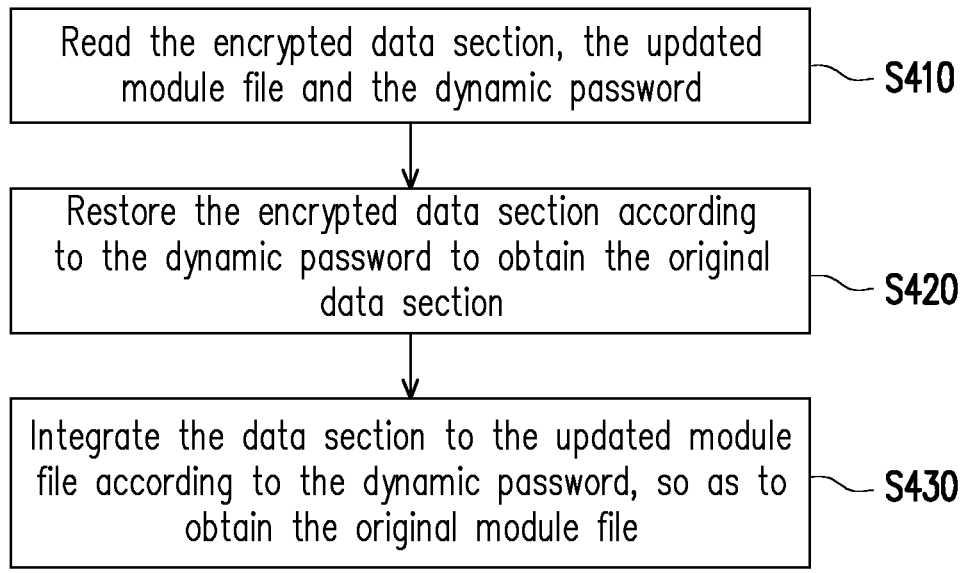
FIG. 4 is a flowchart illustrating a file protection method according to an embodiment of the disclosure.
Figure 5:
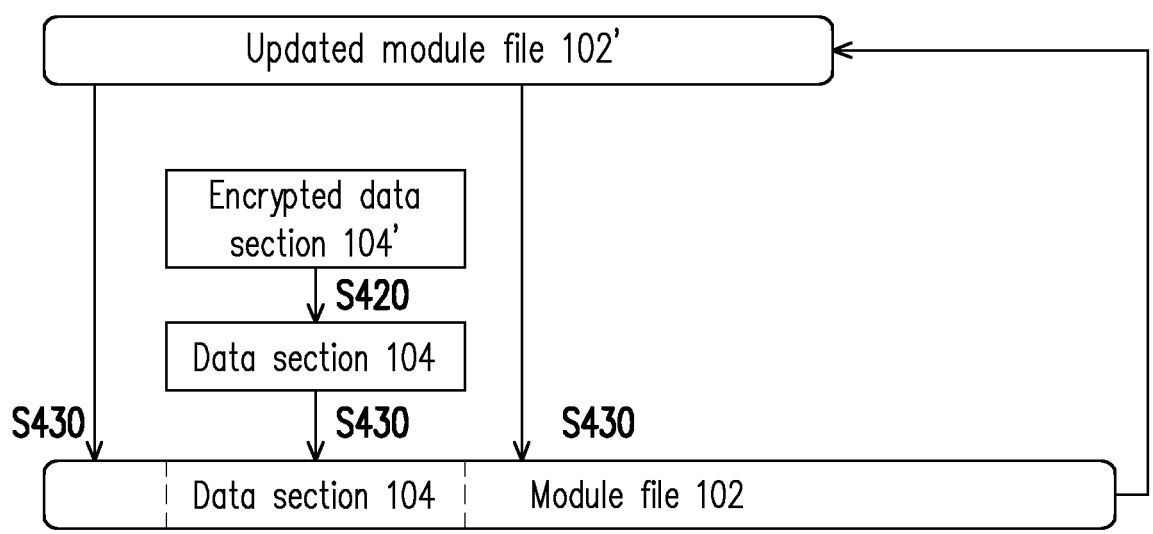
FIG. 5 is a schematic diagram of a module file structure according to an embodiment of the disclosure.

FIG. 4 is a flowchart illustrating a file protection method according to an embodiment of the disclosure. FIG. 5 is a schematic diagram of a module file structure according to an embodiment of the disclosure. The file protection method of FIG. 4 is at least adapted to the file processing system 100 of FIG. 1, and the module file structure of FIG. 5 at least corresponds to the file processing system 100 of FIG. 1 and the file protection method of FIG. 4. How to restore the updated module file 102' to obtain the original module file 102 is described below with reference of FIG. 4 and FIG. 5.

In a step S410, the data accessing unit 120 reads the encrypted data section 104', the updated module file 102' and the dynamic password.

In a step S420, the data encryption and decryption unit 140 restores the encrypted data section 104' according to the dynamic password to obtain the original data section 104. The data encryption and decryption unit 140 may restore the data section 104 according to the encryption algorithm used for encrypting the data section 104.

In a step S430, the data intercepting unit 130 integrates the data section 104 to the updated module file 102' according to the dynamic password, so as to obtain the original module file 102. In the embodiment of the disclosure, the data intercepting unit 130 adds the data section 104 to the updated module file 102' according to the position of the data section 104, so as to restore the original module file 102. In this way, the restored module file 102 may be reused in programs such as data analysis or execution of automated services, etc.

It should be noted that in an embodiment of the disclosure, in order to enhance the security of the module file 102, the steps S220 and S230 are repeatedly executed in the file processing system 100 and the file protection method to obtain a plurality of data sections, such that the updated module file 102' is further fragmented.

Figure 6:
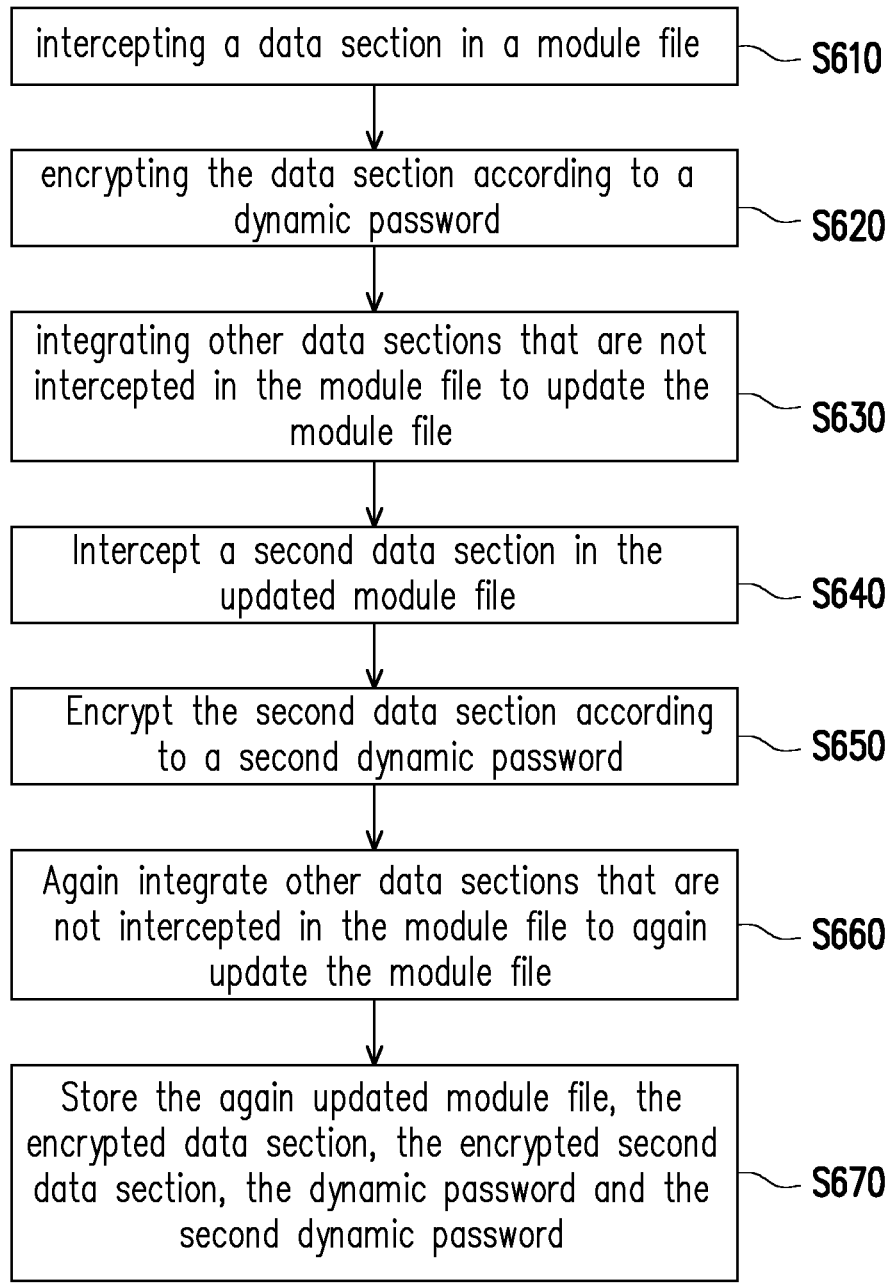
FIG. 6 is a flowchart illustrating a file protection method according to still another embodiment of the disclosure.

Referring to FIG. 6, FIG. 6 is a flowchart illustrating a file protection method according to still another embodiment of the disclosure. The file protection method of FIG. 6 is also adapted to the file processing system 100 of FIG. 1, but the disclosure is not limited thereto. In the embodiment, steps S610 to S630 are similar to the steps S210 to FIG. 230, and details thereof are not repeated.

In a step S640, the data intercepting unit 130 further intercepts a second data section in the updated module file. The data intercepting unit 130 intercepts the second data section in the updated module file in a random manner. Moreover, the content, size and position of the second data section intercepted by the data intercepting unit 130 are not limited by the embodiment of the disclosure. The data intercepting unit 130 may record or mark the position of the intercepted second data section. Moreover, the second data section 104 is removed from the updated module file. In the embodiment, since the data intercepting unit 130 again intercepts the second data section from the updated module file, positions of the second data section and the first data section in the original module file are different.

In a step S650, the data encryption and decryption unit 140 further encrypts the second data section according to a second dynamic password. Similar to the step S220, the data encryption and decryption unit 140 may generate the second dynamic password according to at least one of the position information of the second data section, the content of the second data section and the size of the second data section. Since the positions, contents and sizes of the data section and the second data section are different, the generated dynamic password and the second dynamic password are different.

Moreover, the data encryption and decryption unit 140 may take the second dynamic password as a key, and adopt the AES algorithm to encrypt the second data section.

In a step S660, the data intercepting unit 130 again integrates other data sections that are not intercepted in the module file to again update the module file. Namely, in the again updated module file, the data section and the second data section have been removed.

In the embodiment, the data intercepting unit 130 may intercept different data sections by multiple times, for example, to further intercept a third data section, a fourth data section, a fifth data section, etc. The data encryption and decryption unit 140 further generates a third dynamic password, a fourth dynamic password, a fifth dynamic password, . . . , etc., and accordingly generates the encrypted third data section, fourth data section, fifth data section, . . . , etc. Moreover, the data intercepting unit 130 may correspondingly update the module file by multiple times. Since details of intercepting, encrypting different data sections and updating the module file by multiple times are similar to the step S610 to the step S660, details thereof are not repeated.

In a step S670, the data accessing unit 120 stores the again updated module file, the encrypted data section, the encrypted second data section, the dynamic password and the second dynamic password. It should be noted that after multiple updates, the data accessing unit 120 only stores the latest updated module file to the storage 110. Moreover, as described above, the data accessing unit 120 may compile the again updated module file, the encrypted data section, the encrypted second data section, the dynamic password and the second dynamic password into an executive file, and stores the executive file to the storage 110.

Figure 7:
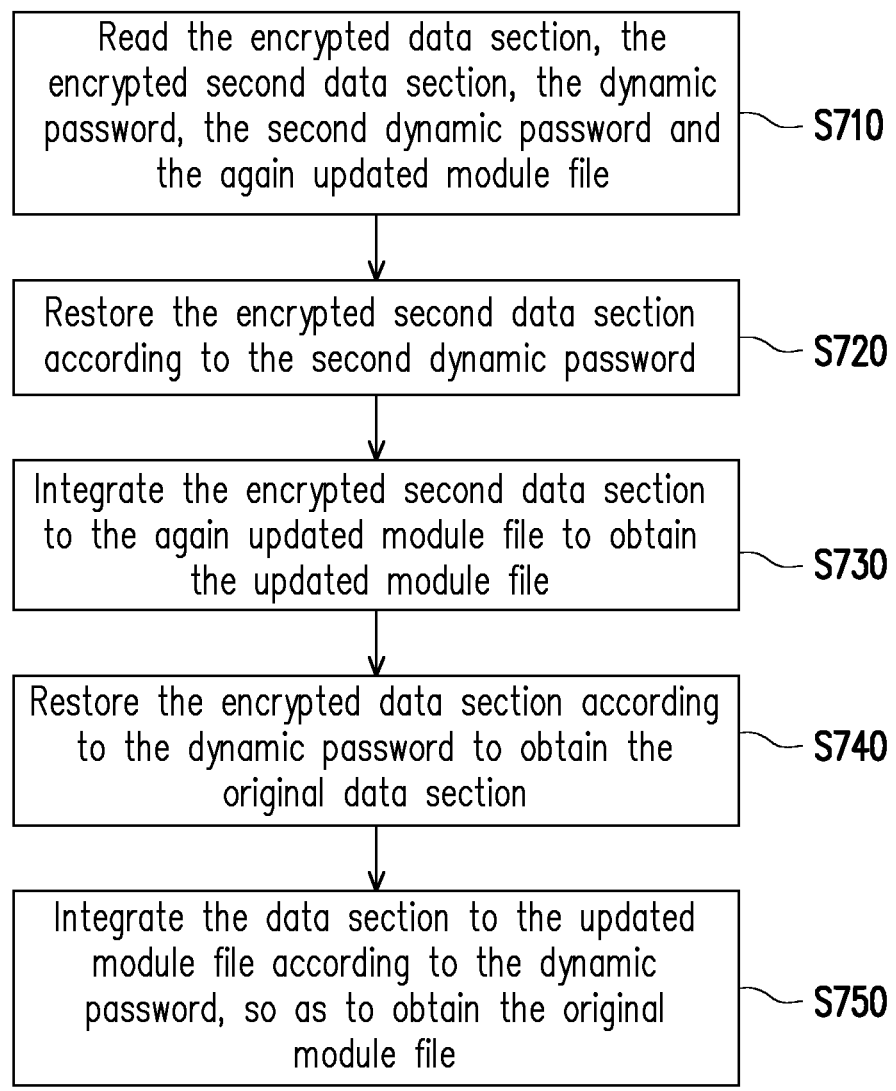
FIG. 7 is a flowchart illustrating a file protection method according to still another embodiment of the intention.

Referring to FIG. 7, FIG. 7 is a flowchart illustrating a file protection method according to still another embodiment of the intention. The file protection method of FIG. 7 is also adapted to the file processing system 100 of FIG. 1, but the disclosure is not limited thereto.

In a step S710, the data accessing unit 120 reads the encrypted data section, the encrypted second data section, the dynamic password, the second dynamic password and the again updated module file.

In a step S720, the data encryption and decryption unit 140 restores the encrypted second data section according to the second dynamic password. The data encryption and decryption unit 140 restores the second data section according to the encryption algorithm used for encrypting the second data section.

In a step S730, the data intercepting unit 130 integrates the encrypted second data section to the again updated module file to obtain the updated module file. To be specific, the data intercepting unit 130 integrates the second data section to the again updated module file according to the position of the second data section in the updated module file, so as to restore the updated module file.

A step S740 to a step S750 are the same to the step S420 to the step S430, and details thereof are not repeated.

It should be noted that in the file processing system 100 and the file protection method, each time one data section is intercepted from the module file, and the intercepted data section is removed from the module file, so as to update the original module file. Since the module file is a coded file, for example, a binary file, if a certain part of the data section is removed, original information cannot be displayed. Particularly, the module file generated by machine learning has a large number of parameters, and even if only a small piece of data is removed from the module file, the original parameters of the module file cannot be restored correctly. In this case, if the module file with the data section removed is continually adopted to analyze data or provide the function of automated service, an output result thereof may have a great difference with an output result generated by using the original module file.

Moreover, after one data section is intercepted from the module file, a dynamic password is generated according to the data section, each data section is encrypted according to the corresponding dynamic password, i.e. each data section is respectively encrypted by adopting a different password. Since a size the content of the data section is greater smaller than a size of the original module file, compared to encryption of the same file, a time of restoring the original module file is saved. In an actual application, when the whole module file is encrypted by adopting the AES algorithm, a time required for restoring the module file is 56 seconds. When the file processing system 100 and the file protection method of the disclosure are applied, and five data segments are intercepted for encryption, and a time required for restoring the module file is only 6 seconds. Particularly, when the AES algorithm is adopted to encrypt the module file, only one set of password is required for encryption and decryption, but the file processing system 100 and the file protection method of the disclosure adopt five sets of passwords to implement the encryption and decryption, by which not only a speed of restoring the module file is increased, security of the module file is also improved.

Moreover, each time a new data section is intercepted based on the module file from which the intercepted data section has been removed. Namely, the intercepted new data section is not necessarily continuous data in the original module file. Therefore, each time after the intercepted data section is removed, the content of the updated module file is more and more obfuscated, so as to improve the security of the module file.

In summary, the file processing system and file protection method of the disclosure may intercept and remove the data sections in the module file to displace the content of the module file to make it hard to be restored. Moreover, the intercepted data section is encrypted by a dynamic password to increase security. Since the size of the intercepted data section is smaller than the whole data size of the module file, the speed of restoring data is higher than the speed for encrypting and restoring the whole module file. Therefore, the file processing system and the file protection method of the disclosure may maintain security of the module file and meanwhile improving the speed of restoring the module file.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A file protection method, comprising:
   intercepting a data section in a module file;
   encrypting the data section according to a dynamic password;
   integrating other data sections that are not intercepted in the module file to update the module file;
   storing the updated module file, the encrypted data section and the dynamic password;
   reading the encrypted data section, the updated module file and the dynamic password;
   restoring the encrypted data section according to the dynamic password;
   integrating the data section to the updated module file according to the dynamic password, so as to obtain the original module file;
   intercepting a second data section in the updated module file;
   encrypting the second data section according to a second dynamic password;
   again integrating other data sections that are not intercepted in the module file to again update the module file;
   storing the again updated module file, the encrypted data section, the encrypted second data section, the dynamic password and the second dynamic password;
   reading the encrypted data section, the encrypted second data section, the dynamic password, the second dynamic password and the again updated module file; and
   restoring the encrypted second data section according to the second dynamic password, and integrating the encrypted second data section to the again updated module file to obtain the updated module file.

2. The file protection method as claimed in claim 1, further comprising:
   generating the dynamic password according to at least one of position information of the data section, content of the data section and a size of the data section.

3. The file protection method as claimed in claim 1, wherein the step of storing the updated module file and the encrypted data section further comprises:
   compiling the updated module file, the encrypted data section and the dynamic password into an executive file, and storing the executive file.

4. The file protection method as claimed in claim 1, wherein the data section is encrypted according to an advanced encryption standard algorithm.

5. A file processing system, comprising:
   a storage, storing a module file;
   a processor, connected to the storage, comprising a data accessing unit, a data intercepting unit, and a data encryption and decryption unit, wherein,
   the data accessing unit, configured to access the module file stored in the storage;
   the data intercepting unit, intercepting a data section in the module file; and
   a data encryption and decryption unit, encrypting the data section according to a dynamic password, and storing the encrypted data section,
   wherein the data intercepting unit integrates other data sections that are not intercepted in the module file to update the module file, and stores the updated module file, the encrypted data section and the dynamic password to the storage;
   the data accessing unit reads the encrypted data section, the updated module file and the dynamic password;
   the data encryption and decryption unit restores the encrypted data section according to the dynamic password;
   the data intercepting unit integrates the data section to the updated module file according to the position information of the data section and the content of the data section, so as to obtain the original module file;
   the data intercepting unit intercepts a second data section in the module file;
   the data encryption and decryption unit encrypts the second data section according to a second dynamic password;
   the data intercepting unit again integrates other data sections that are not intercepted in the module file to again update the module file;
   the data accessing unit stores the again updated module file, the encrypted data section, the encrypted second data section, the dynamic password and the second dynamic password;
   the data encryption and decryption unit reads the encrypted data section, the second data section, the dynamic password, the second dynamic password and the again updated module file; and
   the data encryption and decryption unit restores the encrypted second data section according to the second dynamic password, and the data intercepting unit integrates the encrypted second data section to the again updated module file to obtain the updated module file, and the data encryption and decryption unit restores the encrypted data section and the data intercepting unit integrates the encrypted data section to the updated module file to obtain the original module file.

6. The file processing system as claimed in claim 5, wherein
   the data encryption and decryption unit generates the dynamic password according to at least one of position information of the data section, content of the data section and a size of the data section.

7. The file processing system as claimed in claim 5, wherein
   the data accessing unit compiles the updated module file, the encrypted data section and the dynamic password into an executive file, and stores the executive file to the storage.

8. The file processing system as claimed in claim 5, wherein
   the data encryption and decryption unit encrypts the data section according to an advanced encryption standard algorithm.

* * * * *